UNITED STATES PATENT OFFICE.

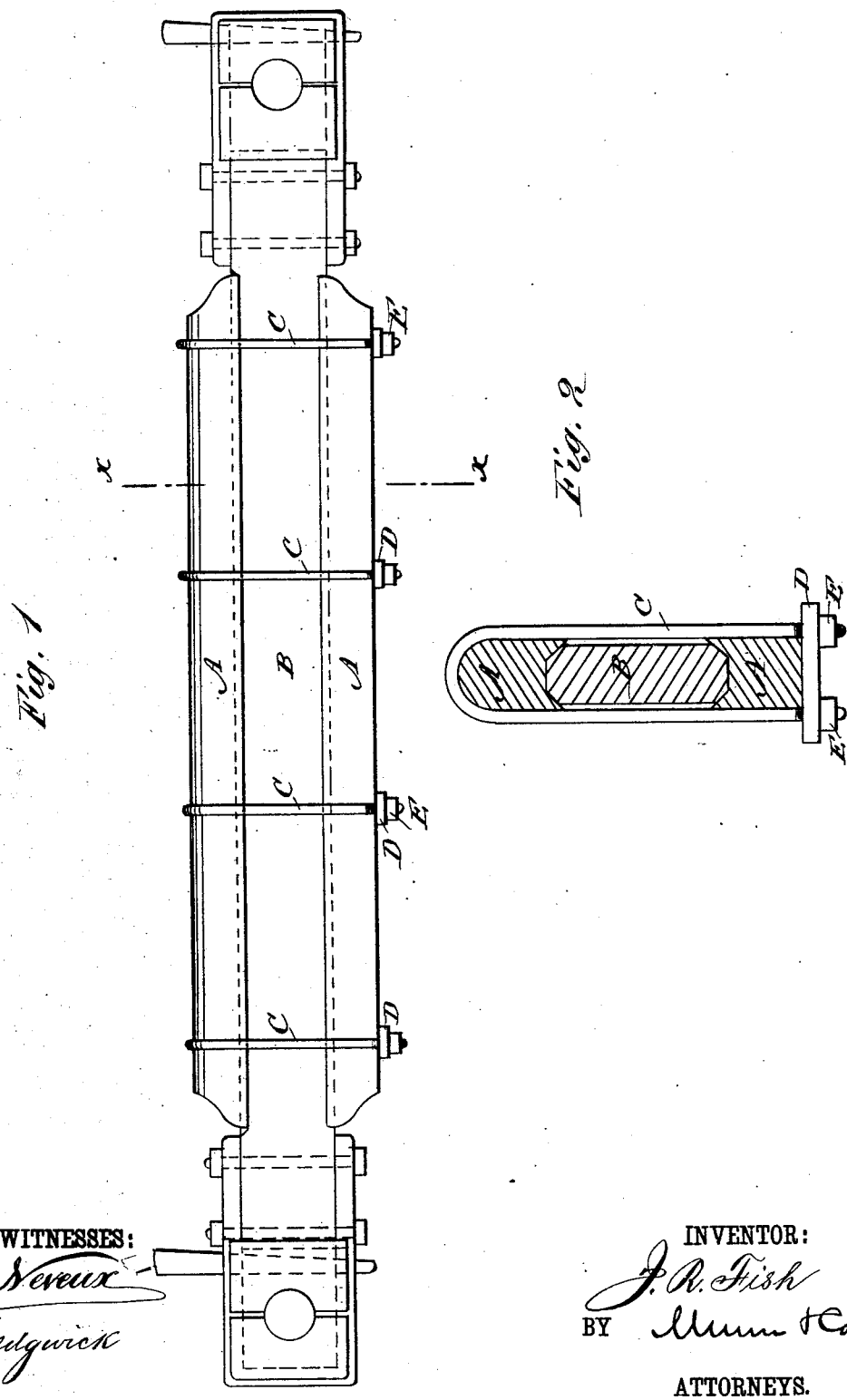

JOHN R. FISH, OF GRAND RAPIDS, MICHIGAN.

SIDE BAR FOR LOCOMOTIVES.

SPECIFICATION forming part of Letters Patent No. 244,803, dated July 26, 1881.

Application filed March 29, 1881. (No model.)

*To all whom it may concern:*

Be it known that I, JOHN R. FISH, of Grand Rapids, Kent county, Michigan, have invented a new and Improved Side Bar for Locomotives, of which the following is a specification.

The object of my invention is to prevent the side bars of locomotives from breaking in cold weather.

The invention consists in a side bar connecting the driving-wheels of a locomotive, having longitudinal strips of wood attached thereto parallel therewith, which strips break the shocks or vibrations caused by irregularities of the track, and thus protect the side bar.

In the accompanying drawings, Figure 1 is a longitudinal elevation of my improved side bar for locomotives, and Fig. 2 is a cross-sectional elevation of the same on the line $x\ x$, Fig. 1.

Similar letters of reference indicate corresponding parts.

Wooden strips A A are attached to the top and bottom edges of a side bar, B, of a locomotive, either by means of clevises C, cross-plates D, and nuts E, or in any other suitable manner, these strips A A extending throughout the entire length of the side bar, B.

It is well known that the side bars connecting the driving-wheels of locomotives are very apt to break if they receive a shock or jars in cold and frosty weather. These accidents will be prevented if the side bar is protected in the manner described, for the strips of wood are elastic and will break the force of the shocks or jars, and will prevent the undue vibrations of the side bar, and the side bar is relieved of the great strain on the same caused by jumping of the driving-wheels over open joints, bent rails, &c.

Having thus described my invention, I claim as new and desire to secure by Letters Patent—

1. A side bar for connecting the driving-wheels of a locomotive, made substantially as herein shown and described, with strips of wood attached longitudinally to the top and bottom edges of the side bar, as set forth.

2. The combination, with the locomotive side bar, B, of the wooden strips A A, attached longitudinally to the bar B, and of the clevises C, transverse plates D, and nuts E E, substantially as herein shown and described, and for the purpose set forth.

3. A side bar for locomotives, consisting of the side bar proper, longitudinal wooden strips, and clevises for holding the strips to the side bar proper, all combined as shown and described.

JOHN R. FISH.

Witnesses:
JOHN A. BOSSLER,
JOHN J. DE JOUGE.